Jan. 14, 1930.  C. W. FULTON  1,743,446
METAL ROLL
Filed Jan. 24, 1927
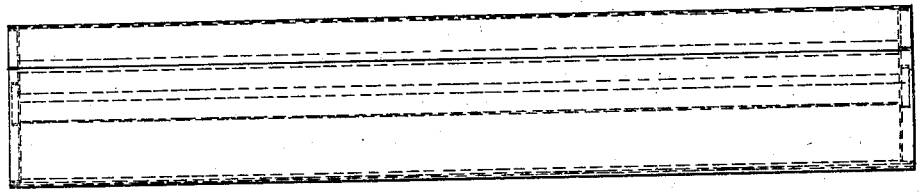
FIG.-1
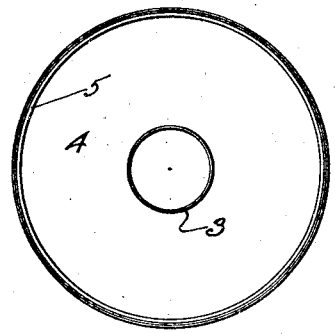
FIG.-2
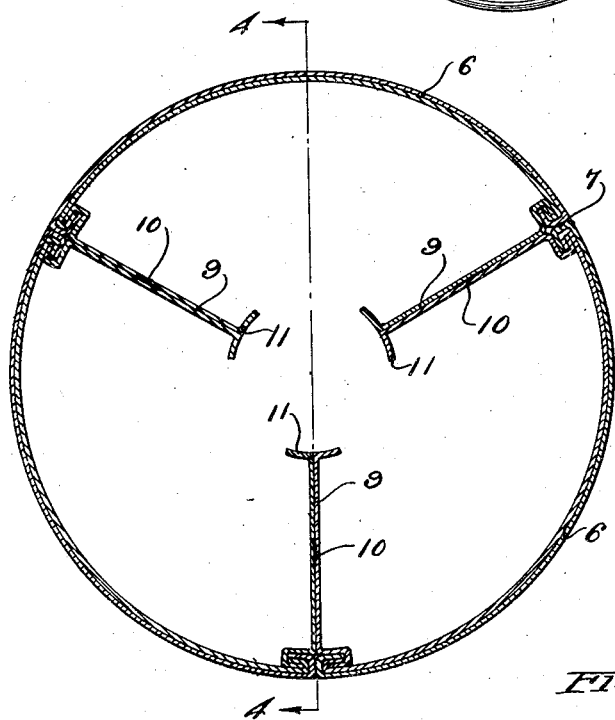
FIG.-3
FIG.-4
Inventor
Clifford W. Fulton
By Brockett & Hyde
Attorneys Patented Jan. 14, 1930

1,743,445

UNITED STATES PATENT OFFICE

CLIFFORD W. FULTON, OF CLEVELAND, OHIO

METAL ROLL

Application filed January 24, 1927. Serial No. 163,165.

This invention relates to rolls for ironing machines, its object being to provide a light, strong roll which can be made so closely cylindrical as to properly mate and function with its companion ironing member, which is capable of convenient assembly by simple operations and is suitable for quantity production at low cost but within reasonable limits of accuracy in workmanship, and which, nevertheless, satisfactorily withstands all of the usual wear and tear of extended service.

In the drawings, which represent one suitable embodiment of the invention, Fig. 1 is an elevation; Fig. 2 is an end view; Fig. 3 is a cross section on the line 3—3, Fig. 4; and Fig. 4 is a longitudinal sectional elevation on the line 4—4, Fig. 3.

The roll shown in the drawings comprises an outer cylindrical or tubular wall or envelope divided into two or more segments or sections and supported by a plurality of webs or struts of sheet form lying in radial planes including the central axis and extending from the central supporting shaft to the outer wall, together with end caps or closures serving not only to close the roll ends but also to lend additional support to the otherwise free end edges of the outer wall.

The central shaft or support 1 need not be made as a part of the roll, but the latter may be slid endwise upon the shaft and attached in any suitable manner to rotate with it. For example, the shaft may be of tubular form, as shown, and its securement to the roll may be effected by spot welding or riveting at several points, as at 2, to the flanges 3 of the end discs 4, although other arrangements are satisfactory for the purpose. Said end discs may also have circumferentially extending flanges 5 at their outer edges.

The outer wall is divided along longitudinal lines into a plurality, three being shown, of like segments 6, each consisting of one, two or more plies of sheet metal bent into the shape of the segment of a cylinder with the longitudinal edges channeled, as at 7. The end portions of the channeled edges of said segments are cut off so that the flanges 5 of the end caps fit snugly within the cylindrical wall or envelope, as shown in Fig. 4, and the end caps may be rigidly secured to the outer wall in any suitable manner, such as by rivets, bolts or spot welding, at several circumferentially spaced points, as indicated at 8. These end caps therefore strongly brace and support the end portions of the outer wall and close the roll ends against the entrance of moisture, dirt, and the like.

The channeled edges of each two adjacent wall segments meet or abut with only a slight crack or crevice interrupting the otherwise continuous outer cylindrical surface, and the abutting edges are supported by suitable webs or struts bridged across to the central shaft. The webs shown for the purpose are of two-ply form, the sheet metal being bent to form two layers or plies 9 placed in contact and at intervals spot welded for securement, as at 10, their outer edges being bent to form facing channels 8 to interlock with and receive the edge flanges 7 of the outer wall segments, and the inner edges of the struts being flanged or otherwise formed to provide footings 11 which rest on the central shaft and transmit to it any pressure applied to the outer surface of the roll.

This arrangement is capable of quantity production at low cost because it is formed essentially of three units, to wit, the segments for the outer wall, the plies or layers of the radial struts, and the circular end caps. Moreover, it is capable of assembly by convenient operations. In manufacture the outer curved wall segments are made up in duplicate form with the end portions of their flanges cut away. In some cases a single ply is sufficient for this outer wall, but to gain additional strength and according to the thickness of gauge of the metal used said outed wall segments may be made of two or more plies if desired. The radial struts each comprise two like members which can be rolled to shape, cut into proper length, placed back to back and spot welded. The roll is then assembled by endwise telescoping movement along the interlocking flanges. After the struts are inserted into interlocked relation with the outer wall members the end caps may be pushed into place and spot welded to the outer wall, thus binding together permanently all of the parts of the roll proper. The central shaft can then be pushed into place and rigidly fastened to the roll in any suitable manner. At the same time the entire roll is quite strong and may be made practically cylindrical without unnecessary and costly accuracy in workmanship.

What I claim is:

1. A metal roll, comprising a plurality of sheet metal segments superposed in pairs and forming a roll, and means engaging the edges of two adjacent pairs of segments for interlocking them together.

2. A metal roll, comprising a plurality of superposed segments interlocked in pairs, and means engaging the edges of each two adjacent pairs of interlocked segments for interlocking the pairs of interlocked segments so as to form a metal roll.

3. A metal roll, comprising a plurality of segments, and a plurality of sheet metal members for connecting said segments so as to form the same into a metal roll, said members extending longitudinally within the roll so formed and being arranged to form radially extending walls.

4. A metal roll, comprising a plurality of sheet metal segments together forming a cylindrical wall, and radially and longitudinally extending webs interlocked therewith.

5. A metal roll, comprising a plurality of sheet metal segments together forming a cylindrical wall, and radially extending webs interlocked therewith, each web being interlocked with the adjacent edge portions of two segments.

6. A metal roll, comprising a plurality of sheet metal segments together forming a cylindrical wall, and radially extending webs interlocked therewith, and said webs being provided with footings adapted to rest upon a central shaft.

7. A metal roll, comprising a plurality of sheet metal segments together forming a cylindrical wall, and radially extending webs interlocked therewith, each web being interlocked with the adjacent edge portions of two segments, and said webs being provided with footings adapted to rest upon a central shaft.

8. A metal roll, comprising a plurality of sheet metal segments together forming a cylindrical wall, radially and longitudinally extending webs interlocked therewith, and end caps closing the end openings and supporting the end edges of the segments.

9. A metal roll, comprising a plurality of complementary sheet metal segments forming a roll and meeting along longitudinal extending lines, and means interlocking with the longitudinally extending edge portions of two adjacent segments for securing them together, said means also extending radially inwardly and adapted for support upon a central shaft.

10. A metal roll, comprising a plurality of complementary sheet metal segments forming a roll and meeting along longitudinally extending lines, and means independent of the segments interlocking with the longitudinally extending edge portions of two adjacent segments for securing them together.

In testimony whereof I hereby affix my signature.

CLIFFORD W. FULTON.